(12) United States Patent
Kim

(10) Patent No.: US 7,936,283 B2
(45) Date of Patent: May 3, 2011

(54) METHOD FOR DETECTING PARKING AREA BY USING RANGE SENSOR

(75) Inventor: Dong-suk Kim, Siheung (KR)

(73) Assignee: Mando Corporation, Gyeonggi-do (KR)

( * ) Notice: Subject to any disclaimer, the term of this patent is extended or adjusted under 35 U.S.C. 154(b) by 476 days.

(21) Appl. No.: 12/150,214

(22) Filed: Apr. 24, 2008

(65) Prior Publication Data
US 2008/0266139 A1 Oct. 30, 2008

(30) Foreign Application Priority Data

Apr. 27, 2007 (KR) .......................... 10-2007-0041388

(51) Int. Cl.
*B60Q 1/48* (2006.01)
*G08G 1/14* (2006.01)

(52) U.S. Cl. ...................... 340/932.2; 340/903; 340/435; 340/436; 340/437; 701/23; 701/41; 701/65; 701/96; 180/167; 180/199; 180/204

(58) Field of Classification Search ................ 340/932.2, 340/903, 435–437, 425.5; 701/1, 23, 36, 701/41, 65, 96, 300–302; 342/70, 76, 85, 342/90, 95, 105, 107, 109; 180/167–169, 180/199, 204; 318/580, 587; 348/61, 113, 348/118, 148

See application file for complete search history.

(56) References Cited

U.S. PATENT DOCUMENTS

| | | | | |
|---|---|---|---|---|
| 4,931,930 A * | 6/1990 | Shyu et al. | | 701/36 |
| 6,621,421 B2 * | 9/2003 | Kuriya et al. | | 340/932.2 |
| 6,999,003 B2 * | 2/2006 | Matsukawa et al. | | 340/932.2 |
| 2002/0175832 A1 * | 11/2002 | Mizusawa et al. | | 340/932.2 |
| 2005/0035879 A1 * | 2/2005 | Gotzig et al. | | 340/932.2 |
| 2005/0125155 A1 * | 6/2005 | Kudo | | 701/301 |
| 2005/0285758 A1 * | 12/2005 | Matsukawa et al. | | 340/932.2 |
| 2007/0146164 A1 * | 6/2007 | Schmid et al. | | 340/932.2 |

* cited by examiner

*Primary Examiner* — George A. Bugg
*Assistant Examiner* — Sisay Yacob
(74) *Attorney, Agent, or Firm* — McDermott Will & Emery LLP

(57) ABSTRACT

A parking space is detected by using a range sensor. Distance data in a predetermined period is collected by using the range sensor according to a user's selection and mapping the collected distance data on a coordinates system based on a parking space searching vehicle. The collected distance data are classified into short distance data and long distance data. Parking-available distance data, is calculated. Whether the parking space exists based on the calculated parking-available distance data is checked. The parking space searching vehicle is stopped by controlling an active braking apparatus or recommending a driver to stop the parking space searching vehicle by means of a voice and alarm sounds when it has been checked that the parking space exists.

7 Claims, 3 Drawing Sheets

METHOD FOR DETECTING PARKING AREA BY USING RANGE SENSOR

CROSS-REFERENCE TO RELATED APPLICATION

This non-provisional application claims priority under 35 U.S.C §119(a) on Patent Application No. 10-2007-0041388 filed in Korea on Apr. 27, 2007, the entire contents of which are hereby incorporated by reference.

BACKGROUND OF THE INVENTION

1. Field of the Invention

The present invention relates to a method for detecting a parking space by using a range sensor, and more particularly to a method for detecting a parking space by using a range sensor, in which distance data obtained by a range sensor is mapped on a coordinate system based on a vehicle having the range sensor, the obtained distance data is classified into short distance data and long distance data, and it is determined if an available parking area exists so as to be provided to a driver.

2. Description of the Prior Art

A semiautomatic parking system is an apparatus in which a steering operation required for a parking process is automated so as to improve convenience for a driver. In general, drivers are much interested in a parking auxiliary system. Therefore, main vehicle manufacturers and component auto parts makers have developed various types of parking auxiliary systems.

Such a semiautomatic parking system can include a recognizing unit and a control unit. The recognizing unit performs a function for obtaining information regarding an available parking area through a parking environment recognizing algorithm operation by means of an environment information obtaining sensor, such as a vision sensor or a range sensor (ultrasonic wave, laser, etc). The control unit performs a control operation so that an active steering apparatus is controlled based on a result obtained by the operation in the recognizing unit so as to allow a vehicle to be parked at a recognized parking area.

In order to perform a parallel parking function of the semiautomatic parking system, it is necessary to extract information regarding an available parking space by obtaining information regarding an empty parking area between vehicles parked in a row at a side of a road. Particularly, the semiautomatic parking system has to extract relative coordinates between own vehicle and the available parking space.

Therefore, it is required to develop a technique for recognizing an available parking space, which can further accurately and rapidly determine and recognize a target parking position through only a simple operation performed by the driver.

SUMMARY OF THE INVENTION

Accordingly, the present invention has been made to solve the above-mentioned problems occurring in the prior art, and the present invention provides a method for detecting a parking area by using the range sensor, in which distance data obtained by a range sensor is mapped on a coordinate system based on a vehicle having the range sensor, the obtained area data is classified into short distance data and long distance data, and it is determined if an available parking area exists so as to be provided to a driver.

In accordance with an aspect of the present invention, there is provided a method for detecting a parking space by using a range sensor, which includes the steps of; (a) collecting, by a parking environment recognition control unit, distance data in a predetermined period by using the range sensor according to a user's selection and mapping the collected distance data on a coordinates system based on a parking space searching vehicle: (b) classifying the collected distance data into short distance data and long distance data; (c) calculating parking-available distance data which is a horizontal movement distance of an interval where the long distance data is collected from when the long distance data starts to be collected; (d) checking if the parking space exists based on the calculated parking-available distance data; (e) stopping the parking space searching vehicle by controlling an active braking apparatus or recommending a driver to stop the parking space searching vehicle by means of a voice and alarm sounds when it has been checked in steps (d) that the parking space exists; and (f) generating the distance data, which has been mapped based on the parking space searching vehicle in step (a) and has been classified into the short distance data and the long distance data in step (b), as a parking environment map.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

Figure 1:
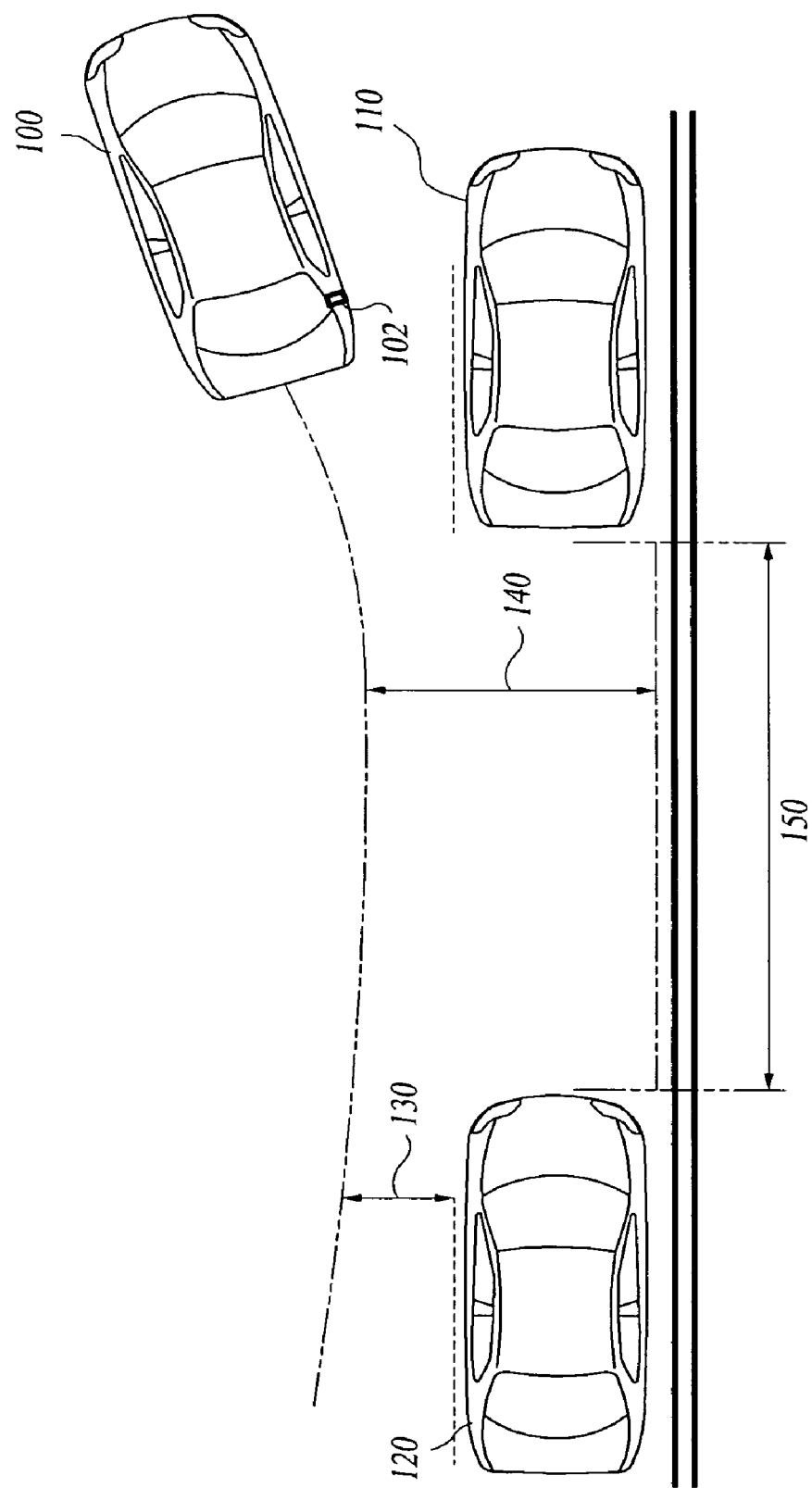
FIG. 1 is a view illustrating the movement of a vehicle while a parking space is detected by an area sensor according to an exemplary embodiment of the present invention.

FIG. 1 is a view illustrating the movement of a vehicle while a parking space is detected by an area sensor according to an exemplary embodiment of the present invention.

A parking space searching vehicle 100 according to an embodiment of the present invention includes area sensors 102 mounted on both side surfaces of the vehicle.

In order to make it easy to understand the present invention, it is assumed that an available parking space, at which the parking space searching vehicle 100 can be parked, exists between a first parked vehicle 110 and a second parked vehicle 120, which are parked at a parallel space.

The parking space searching vehicle 100 detects a distance by means of a range sensor 102 so as to search a parking space.

Distance data collected by the range sensor 102 is classified into short distance data 130 obtained due to an obstacle (the first parking vehicle 110 or the second parking vehicle 120 in the present invention) and long distance data 140 obtained due to empty space without an obstacle (an empty space between the first parking vehicle 110 and the second parking vehicle 120 in the present invention).

In the present invention, distance data collected by the range sensor 102 is classified into two classes in such a reference manner that when width of the parking space searching vehicle 100 is determined as a critical value, the distance data is classified as long distance data 140 in a case where a difference value between current collected distance data and just previously collected distance data is a positive number, and the positive number exceeds the critical value, and the distance data is classified as short distance data 130 in a case where a difference value between current collected distance data and just previously collected distance data is a negative number and an absolute value thereof exceeds the critical value.

Also, the distance data is classified as short distance data 130 in a case where a difference value between the current collected distance data and just previously collected distance data does not exceed the critical value although the difference value is a positive number, and the distance data is classified as long distance data 140 in a case where the absolute value of a difference value between current collected distance data and just previously collected distance data does not exceed the critical value, although the difference value is a negative number.

When the long distance data 140 is collected while distance data is collected by the range sensor 120, a parking environment recognition control unit of the parking space searching vehicle 100 stores the time period between a time point where the long distance data 140 starts to be collected and a time point just before the short distance data 130 starts to be collected and movement velocity of the parking space searching vehicle 100, respectively, and then calculates parking-available distance data 150 base on the stored period of time and the movement velocity while the long distance data 140 is collected.

For example, if it is assumed that the time period between a time point where the long distance data 140 starts to be collected and a time point just before the short distance data 130 is collected is five seconds, and an average value of movement velocity of the parking space searching vehicle 100 is 5 km/h during the time period between the time point where the long distance data 140 starts to be collected and the time point just before the short distance data 130 is collected, a distance where the parking space searching vehicle 100 moves for one second is 1.3 m during the time period between the time point where the long distance data 140 starts to be collected and the time point just before the short distance data 130 is collected, so that a distance where the parking space searching vehicle 100 moves while the long distance data 140 is collected is 6.5 m, and then this distance of 6.5 m becomes parking-available distance data 150.

In order to allow the parking space searching vehicle 100 to be parked, the parking-available distance data 150 calculated in the parking environment recognition control unit has to be a distance longer at a certain degree than the length of the parking space searching vehicle 100. Therefore, a critical value of the parking-available distance data 150 is a value obtained by adding a predetermined length to the length of the parking space searching vehicle 100. That is, the critical value can be changed according to the length of the parking space searching vehicle 100.

Figure 2:
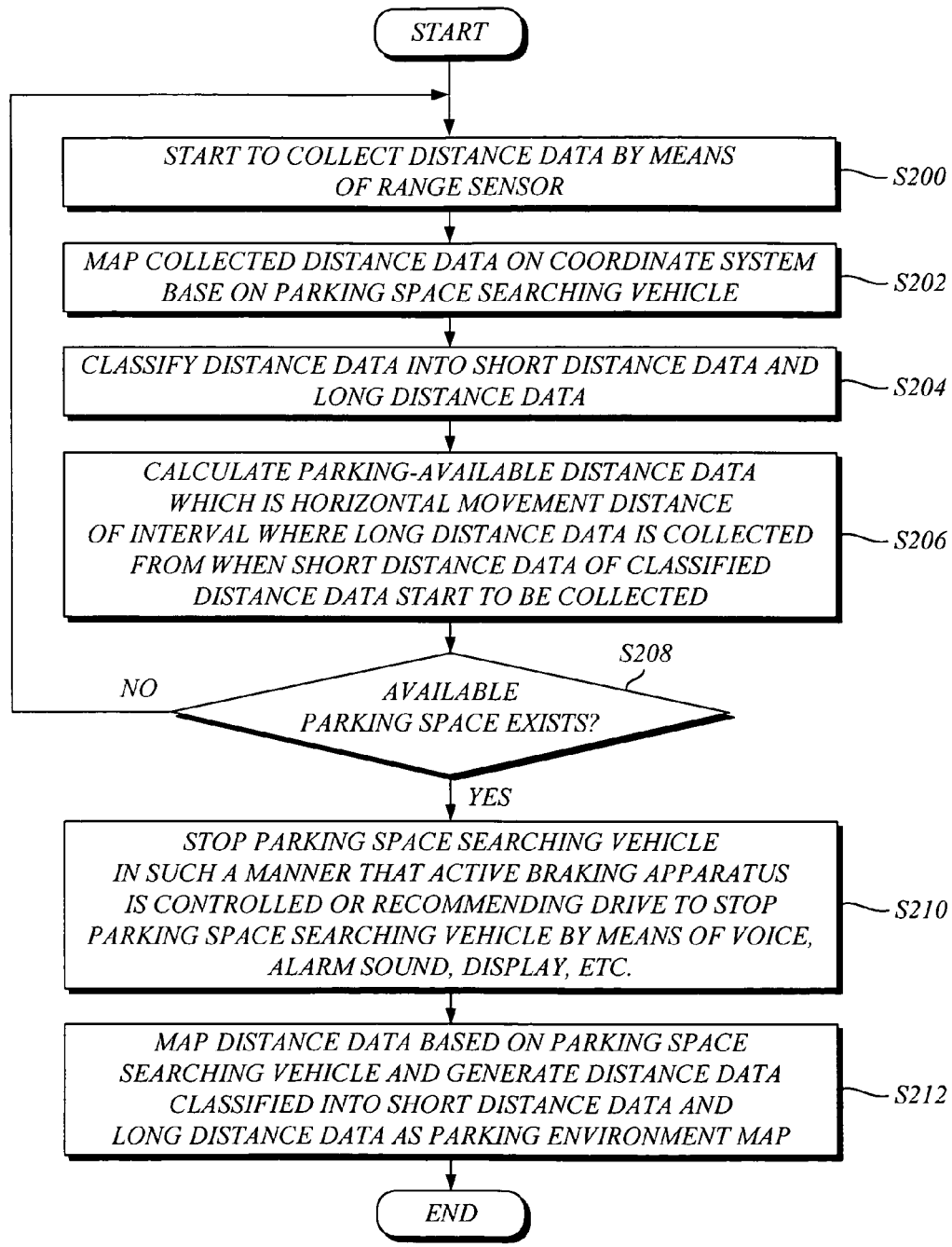
FIG. 2 is a flow chart illustrating a process for detecting a parking space by means of an area sensor according to an exemplary embodiment of the present invention.

FIG. 2 is a flow chart illustrating a process for detecting a parking space by means of the area sensor according to an exemplary embodiment of the present invention.

In order to achieve parking, the parking environment recognition control unit of the parking space searching vehicle 100 has to collect distance data so as to search for an available parking area in a parallel parking space by means of a range sensor 102. Therefore, the parking environment recognition control unit of the parking space searching vehicle 100 starts to collect distance data by using the range sensor 102 at a place, at which parking is intended to be achieved, in step S200.

The time period of collecting distance data, which is detected and collected from the range sensor 102, can be changed according to the user's selection, and it is preferable that distance data is collected in a predetermined time period (e.g. a period of 0.1 second).

When distance data is collected from the range sensor 102 in a predetermined period, the parking environment recognition control unit of the parking space searching vehicle 100 maps the collected distance data on a coordinate system based on the parking space searching vehicle 100 in step S202.

Distance data collected while the parking space searching vehicle 100 moves does not reflect the location of the parking space searching vehicle 100, which is changed according to movement velocity or steering operation whenever the data is measured. Therefore, it is impossible to grasp relative location respective to the parking space searching vehicle 100.

For example, in a case where the parking space searching vehicle 100 collects distance data from a location A by using the range sensor 102, the collected distance data does not reflect the location of the parking space searching vehicle 100 when the parking space searching vehicle 100 goes far away from the first parking vehicle 110 at a less degree or near to the first parking vehicle 110 at a less degree due to steering operation of the driver. Therefore, the parking space searching vehicle 100 periodically performs pose estimation of own vehicle (the parking space searching vehicle 100 in the present invention) so as to calculate coordinates of obtained distance data. At this time, the parking space searching vehicle 100 receives data regarding movement of own vehicle, such as a steering angle, velocity of wheels, a yaw, a LG sensor, etc. and calculates the location of the parking space searching vehicle 100 through periodical updating of the above received data. In step S202 in the present invention, the parking environment recognition control unit converts movement data of the parking space searching vehicle 100, which has been calculated by performing pose estimation, and distance data, which has been synchronized and received, to a coordinate system of the own vehicle so that the parking environment recognition control unit maps the distance data on a coordinate system based on the parking space searching vehicle 100 in each period.

A technique for estimating the location of a vehicle, in which the technique is performed, is known for those skilled in the art. Therefore, the description of the technique will be omitted herein.

The parking environment recognition control unit classifies the distance data mapped on the coordinate system based on the parking space searching vehicle 100 in step S202 into short distance data 130 and long distance data 140 in step S204.

In the present invention, distance data collected by using the range sensor 102 is classified into two classes, i.e. short distance data 130, which is data regarding a distance from an obstacle (the first parking vehicle 110 or the second parking vehicle 120 in the present invention) to the parking space searching vehicle 100, and long distance data 140, which is data regarding a distance from empty space without an obstacle (empty space between the first parking vehicle 110 and the second parking vehicle 120 in the present invention) to the parking space searching vehicle 100.

In step S204, only distance data, which is collected in regardless of a process for mapping the distance data collected in step S202 on the coordinate system based on the parking space searching vehicle 100, is used. Therefore, it is possible to simultaneously perform step S204 and step S202.

The parking environment control unit calculates parking-available distance data 150, which is a horizontal movement distance of an interval where the long distance data 140 is collected, from the time point when the long distance data 140 of the distance data classified in step S204 starts to be collected.

When the long distance data 140 is collected while distance data is collected by using the range sensor 102, the parking environment recognition control unit of the parking space searching vehicle 100 stores a time period from a time point when the long distance data 140 starts to be collected to a time point just before the next short distance data 130 starts to be collected and movement velocity of the parking space searching vehicle 100, respectively. Then, the parking environment recognition control unit calculates parking-available distance data 150 while the long distance data 140 is collected based on the stored time period and the movement velocity.

Base on the parking-available distance data 150, it is checked if an available parking space enough to allow the parking space searching vehicle 100 to be parked exists in step S208.

In a case where it has been checked in step S208 that an available parking space enough to allow the parking space searching vehicle 100 to be parked exists, the parking environment recognition control unit stops the parking space searching vehicle 100 by controlling an active braking apparatus or recommends a driver to stop the parking space searching vehicle 100 by means of a voice, alert sounds, a pilot lamp, etc. in step S210.

The parking environment recognition control unit maps the collected distance data based on the parking space searching vehicle 100 in step S202, and generates the distance data, which has been classified into the short distance data 130 and the long distance data 140 in step S204, as a parking environment map in step S212.

After step S212, the parking space searching vehicle 100 is parked by a steering operation of a driver, an automatic parking, or a semiautomatic parking. Herein, techniques of automatic parking and semiautomatic parking are known to those skilled in the art, so descriptions of these will be omitted.

Step S212 will be described together with FIG. 3.

Figure 3:
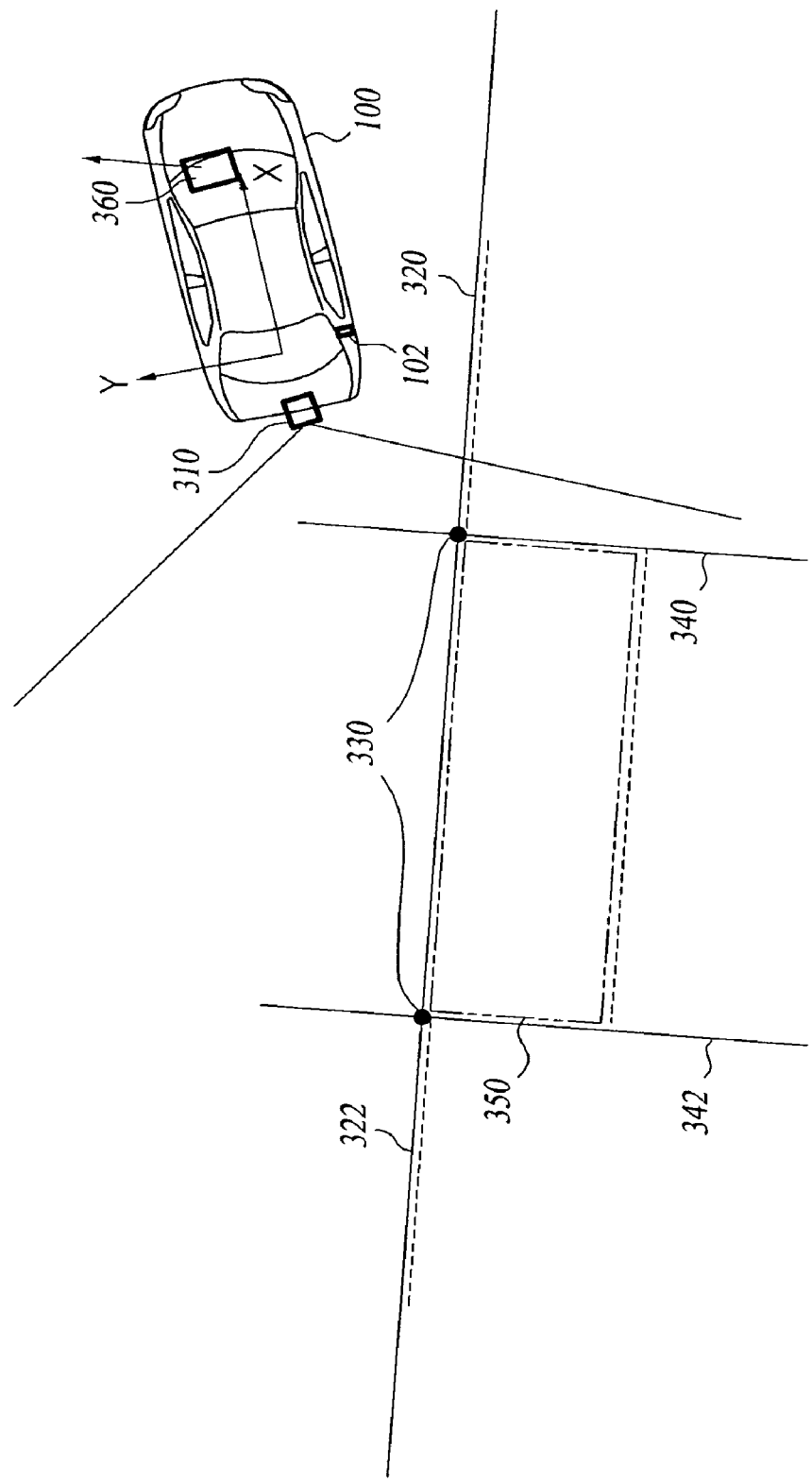
FIG. 3 is a schematic view illustrating a screen where a parking space detected by using an area sensor is display to a driver according to an exemplary embodiment of the present invention.

FIG. 3 is a schematic view illustrating a screen where a parking area detected by an area sensor is displayed to a driver according to an exemplary embodiment of the present invention.

The parking environment recognition control unit of the parking space searching vehicle 100 calculates average values of an X coordinate and a Y coordinate of the short distance data 130 in front and rear directions of the available parking space 350, and detects a front parking side boundary line 320 and a rear parking side boundary line 322 as lines connecting between calculated average values of the X coordinate and the Y coordinate of the short distance data 130. The parking environment recognition control unit also defines lines perpendicular to the front parking side boundary line 320 and the rear parking side boundary line 322 as a parking front boundary line 340 and a parking rear boundary line 342, respectively, while considering a recognition error and a control margin at each boundary point 330 between the short distance data 130 and the long distance data 140.

A line as an interval where the long distance data 140 is collected between the front parking side boundary line 320 and the rear parking side boundary line 322, in which collected average values of the X coordinate and the Y coordinate of the long distance data 140 are calculated, and then the calculated average values of the X coordinate and the Y coordinate of the long distance data 140 are connected with each other, is marked on a parking environment map.

A space having a plan of a square shape, which is formed in such a manner that a line connecting between each boundary point 330 of the short distance data 130 and the long distance data 140, a line connecting between the calculated average values of the X coordinate and the Y coordinate of the long distance data 140, the parking front boundary line 340, and the parking rear boundary line 342 meet each other, becomes an available parking space. In order to allow the parking space searching vehicle 100 to be parked at the square space, the available parking area 350 is displayed on a monitor 360 included in the parking space searching vehicle 100.

When the available parking area is displayed on the monitor 360, it is preferable that a view image converted through an image process is displayed, or the parking environment map is reflected on an image inputted through a rear camera 310 included in the parking space searching vehicle 100 so as to be displayed.

According to the present invention described above, distance data obtained by a range sensor is mapped on a coordinate system based on own vehicle, and the obtained distance data is classified into short distance data and long distance data, and it is determined if an available parking area exists so as to be provided to a driver. Therefore, an available parking area is further rapidly and accurately detected so as to allow the driver to park his/her vehicle in a convenient manner.

Although an exemplary embodiment of the present invention has been described for illustrative purposes, those skilled in the art will appreciate that various modifications, additions and substitutions are possible, without departing from the scope and spirit of the invention as disclosed in the accompanying claims. While the present invention has been shown and described with reference to certain exemplary embodiments thereof, it will be understood by those skilled in the art that various changes in form and details may be made therein without departing from the spirit and scope of the invention as defined by the appended claims. Therefore, an exemplary embodiment of the present invention has not been described for limiting purposes so that the scope and spirit of the invention may not limited by the exemplary embodiment thereof. Accordingly, the scope of the invention is not to be limited by the above embodiments but by the claims and the equivalents thereof.

What is claimed is:

1. A method for detecting a parking space by using a range sensor, comprising the steps of:
    (a) collecting, by a parking environment recognition control unit, distance data in a predetermined period by using the range sensor according to a user's selection and mapping the collected distance data on a coordinates system based on a parking space searching vehicle;
    (b) classifying the collected distance data into short distance data and long distance data;
    (c) calculating parking-available distance data which is a horizontal movement distance corresponding to an interval where the long distance data is collected from a time point when the long distance data starts to be collected;
    (d) checking if the parking space exists based on the calculated parking-available distance data;
    (e) stopping the parking space searching vehicle by controlling an active braking apparatus or recommending a driver to stop the parking space searching vehicle by means of a voice and alarm sounds when it has been checked in steps (d) that the parking space exists; and
    (f) generating the distance data, which has been mapped based on the parking space searching vehicle in step (a)

and has been classified into the short distance data and the long distance data in step (b), as a parking environment map, wherein, in step (c), when the long distance data is collected, a time period between a time-point where the long distance data starts to be collected and a time point just before the short distance data starts to be collected and movement velocity of the parking space searching vehicle are stored, respectively, and then parking-available distance data is calculated based on the time period and the movement velocity.

2. The method for detecting parking space by using a range sensor as claimed in claim 1, wherein, in step (b), a width of the parking space searching vehicle is set as a critical value, the distance data is classified as long distance data in a case where a difference value between current collected distance data and just previously collected distance data is a positive number and the positive number exceeds the critical value, the distance data is classified as short distance data in a case where a difference value between current collected distance data and the just previously collected distance data is a negative number and an absolute value of the negative number exceeds the critical value, the distance data is classified as the short distance data in a case where a difference value between the current collected distance data and the just previously collected distance data does not exceed the critical value although the difference value is a positive number, and the distance data is classified as the long distance data in a case where the absolute value of a difference value between the current collected distance data and the just previously collected distance data does not exceed the critical value although the difference value is a negative number.

3. The method for detecting parking space by using a range sensor as claimed in claim 1, wherein, in step (d), a value obtained by adding a predetermined length to a length of the parking space searching vehicle is set as a critical value of the parking-available distance data so as to check if the parking space exists.

4. The method for detecting parking space by using a range sensor as claimed in claim 1, wherein, in step (f), average values of an X coordinate and a Y coordinate of each short distance data, which is collected before and after the long distance data is collected, are calculated so that lines connecting between the average values of the X coordinate and the Y coordinate of each short distance data are set as a front parking side boundary line and a rear parking side boundary line, while considering a recognition error and a control margin at each boundary point of the short distance data and the long distance data, lines perpendicular to the front parking side boundary line and the rear parking side boundary line, respectively, are defined as a parking front boundary line and a parking rear boundary line, respectively, and the average values of the X coordinate and the Y coordinate of the long distance data are calculated so that a line connecting between the average values of the X coordinate and the Y coordinate of the long distance data is marked on a parking environment map.

5. The method for detecting parking space by using a range sensor as claimed in claim 1, further comprising the step of displaying the generated parking environment map on a monitor included in the parking space searching vehicle in such a manner that the parking environment map is reflected on an image inputted through a rear camera included in the parking space searching vehicle.

6. A method for detecting a parking space by using a range sensor, comprising the steps of:

(a) collecting, by a parking environment recognition control unit, distance data in a predetermined period by using the range sensor according to a user's selection and mapping the collected distance data on a coordinates system based on a parking space searching vehicle;

(b) classifying the collected distance data into short distance data and long distance data;

(c) calculating parking-available distance data which is a horizontal movement distance corresponding to an interval where the long distance data is collected from a time-point when the long distance data starts to be collected;

(d) checking if the parking space exists based on the calculated parking-available distance data;

(e) stopping the parking space searching vehicle by controlling an active braking apparatus or recommending a driver to stop the parking space searching vehicle by means of a voice and alarm sounds when it has been checked in steps (d) that the parking space exists; and (f) generating the distance data, which has been mapped based on the parking space searching vehicle in step (a) and has been classified into the short distance data and the long distance data in step (b), as a parking environment map, wherein, in step (b), a width of the parking space searching vehicle is set as a critical value, the distance data is classified as long distance data in a case where a difference value between current collected distance data and just previously collected distance data is a positive number and the positive number exceeds the critical value, the distance data is classified as short distance data in a case where a difference value between current collected distance data and the just previously collected distance data is a negative number and an absolute value of the negative number exceeds the critical value, the distance data is classified as the short distance data in a case where a difference value between the current collected distance data and the just previously collected distance data does not exceed the critical value although the difference value is a positive number, and the distance data is classified as the long distance data in a case where the absolute value of a difference value between the current collected distance data and the just previously collected distance data does not exceed the critical value although the difference value is a negative number.

7. A method for detecting a parking space by using a range sensor, comprising the steps of:

(a) collecting, by a parking environment recognition control unit, distance data in a predetermined period by using the range sensor according to a user's selection and mapping the collected distance data on a coordinates system based on a parking space searching vehicle;

(b) classifying the collected distance data into short distance data and long distance data;

(c) calculating parking-available distance data which is a horizontal movement distance corresponding to an interval where the long distance data is collected from a time-point when the long distance data starts to be collected;

(d) checking if the parking space exists based on the calculated parking-available distance data;

(e) stopping the parking space searching vehicle by controlling an active braking apparatus or recommending a driver to stop the parking space searching vehicle by means of a voice and alarm sounds when it has been checked in steps (d) that the parking space exists; and (f) generating the distance data, which has been mapped based on the parking space searching vehicle in step (a) and has been classified into the short distance data and the long distance data in step (b), as a parking environment map, wherein, in step (f), average values of an X coordinate and a Y coordinate of each short distance data, which is collected before and after the long distance data is collected, are calculated so that lines connecting between the average values of the X coordinate and the Y coordinate of each short distance data are set as a front parking side boundary line and a rear parking side boundary line, while considering a recognition error and a control margin at each boundary point of the short distance data and the long distance data, lines perpendicular to the front parking side boundary line and the rear parking side boundary line, respectively, are defined as a parking front boundary line and a parking rear boundary line, respectively, and the average values of the X coordinate and the Y coordinate of the long distance data are calculated so that a line connecting between the average values of the X coordinate and the Y coordinate of the long distance data is marked on a parking environment map.

* * * * *